UNITED STATES PATENT OFFICE.

LOUIS GEORG LEFFER, OF COLOGNE, GERMANY.

PROCESS FOR MAKING A SICCATIVE.

No. 864,475.

Specification of Letters Patent.

Patented Aug. 27, 1907.

Application filed June 17, 1905. Serial No. 265,735.

*To all whom it may concern:*

Be it known that I, LOUIS GEORG LEFFER, a subject of the German Emperor, and a resident of Cologne, Germany, have invented certain new and useful Improvements in a Process for Making a Siccative, of which the following is a specification.

The present invention relates to a process for producing a siccative for oils, oil colors, lacquers, varnish and similar materials adapted to be applied as coatings, which as contrasted with the siccatives customary up to the present is obtained without the addition of metal oxids.

The siccative is prepared as follows:—A certain quantity of neutral or only very slightly acidly reacting resin, preferably purified resin, is liqufied by means of heat, and after it has cooled down—but not to such an extent that it is not liquid enough to be capable of being easily stirred round—an amount of oil of turpentine equal in amount to about half the quantity of resin is added. After cooling down still further to about 80 to 60 degrees C. a quantity of alcohol, spirits of wine, wood-spirit, or other alcohols capable of dissolving resin, is added to the extent of about one-tenth of the total weight, the whole being well stirred while this is effected. The product obtained is filtered and can be added as it is to the oils, oil-colors, lacquers, varnish or the like, or however can be diluted with all substances so used in painting, the application of oil, lacquering and varnishing.

If in the preparation of the siccative ordinary commercial resin is employed which in general has a strongly acid reaction, neutralization can be effected during the melting process by supplying well-known materials, such as, for example, carbonates, hydroxids and borates; this method of preparing the siccative involving, of course, very careful filtration for the removal of precipitates especially when alkalies are employed, because resinous soaps can be formed which would after a short time destroy the oil colors.

The siccative can when diluted with alcohol, turpentine or benzin be utilized as a priming-lacquer.

What I claim as my invention and desire to secure by Letters Patent is:—

1. Process for making a siccative for oils, lacquers, colors and the like, consisting in liquefying by heat ordinary commercial resin, in neutralizing the same, in allowing the same to cool down to an extent, however, insufficient to prevent it from being stirred, in adding oil of turpentine, in allowing the product thus obtained to cool down, and in adding an alcohol capable of dissolving resin.

2. Process for making a siccative for oils, lacquers, colors and the like, consisting in liquefying by heat ordinary commercial resin; in neutralizing the same by adding alkaline salts, in allowing the same to cool down to an extent, however, insufficient to prevent it from being stirred, in adding oil of turpentine, in allowing the product thus obtained to cool down, and in adding an alcohol capable of dissolving resin.

3. Process for making a siccative for oils, lacquers, colors and the like, consisting in liquefying by heat resin which has not a strong acid reaction, in allowing the same to cool down to an extent, however, insufficient to prevent it from being stirred, in adding oil of turpentine, in allowing the product thus obtained to cool down, in adding an alcohol capable of dissolving resin, and in simultaneously stirring, in filtering the product obtained, and in diluting with a suitable liquid.

In testimony that I claim the foregoing as my invention I have signed my name in presence of the subscribing witnesses, this 30th day of May 1905.

LOUIS GEORG LEFFER.

Witnesses:
  WILLIAM KUEPPERS,
  JOH. SATSBY.